United States Patent Office 3,171,837
Patented Mar. 2, 1965

3,171,837
4-AROYLALKYL-2-KETO- AND 2,6-DIKETO-PIPERAZINES
Meier E. Freed, Philadelphia, Pa., assignor to American Home Products Corporation, New York, N.Y., a corporation of Delaware
No Drawing. Filed Jan. 7, 1963, Ser. No. 249,613
2 Claims. (Cl. 260—268)

The present invention relates to 4-aroylalkyl-2-keto- and 2,6-diketo-piperazines and to a process for the production thereof.

The novel compounds of the present invention which exhibit central nervous system depressant and anti-cholinergic activities, are represented by the following formula:

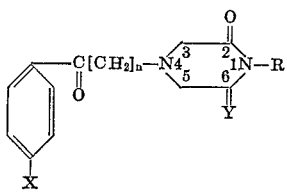

In the above formula, X represents hydrogen, a halogen, preferably fluorine, or an alkoxy radical; R represents hydrogen, lower alkyl, phenyl or aralkyl; Y represents oxygen or two hydrogens and $n$ is an integer ranging from 1 to 3, inclusive.

The novel compounds made available by the present invention advantageously are prepared by the process illustrated by the following equation:

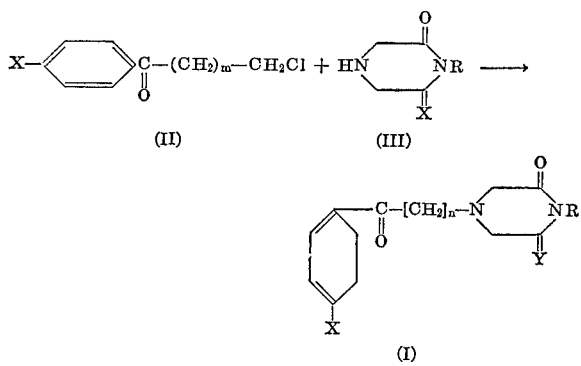

In the above formulas $m$ ranges from 0 to 2; $n$, Y and R have the same meanings previously set forth.

In practising the process of the above equation, approximately 1 mole of a phenyl haloalkyl ketone (II) and about 2 moles of a piperazinone (III) are heated in a solvent inert to the reaction preferably in the presence of a catalytic amount of a catalyst such as potassium iodide or potassium bromide. The temperature range for this reaction is from about 80 to about 130° C., with the optimum temperature being the boiling point of the solvent. The excess piperazinone used in the present reaction serves as an acid scavenger. Accordingly, the reaction may be carried out with equimolar amounts of reactants provided an acid scavenger such as an inorganic carbonate, triethylamine or diisopropylamine is present. The time needed to complete the reaction varies with the selected reactants, and the temperature at which it is carried out, but generally ranges from 2 to 24 hours. Suitable solvents for this reaction include hydrocarbons such as benzene, toluene, xylene; alcohols such as ethanol, isopropanol, n-butanol.

The following examples in which all temperatures are in degrees centigrade, are presented to illustrate the preparation of the novel compounds disclosed herein. It is understood that alternative methods may be employed to prepare these compounds.

EXAMPLE 1

4-(3-[p-fluorobenzoyl] propyl)-2-piperazinone

A solution of 20 grams of 2-piperazinone (0.2 mole), 20 grams of 4-chloro-p-fluorobutyrophenone, and 0.2 gram of potassium iodide in 100 ml. of toluene was heated under reflux for 20 hours. After cooling, the reaction mixture was filtered and the filtrate washed with saline several times. The toluene solution was extracted with dilute (10%) hydrochloric acid. The aqueous extract then was washed with ether and made basic to release an oily layer consisting of the product. The oil layer was extracted into ether, washed with saline, and dried. After filtering and removing the solvent, the product was crystallized from hexane-methylenedichloride. This was converted to the hydrochloride salt and crystallized from ethanol-ether; M.P. 245–246°.

Analysis.—Calcd. for $C_{14}H_{18}ClFN_2O_2$: C, 56.00; H, 6.05; N, 9.33; Cl, 11.73. Found: C, 55.65; H, 6.07; N, 9.60; Cl, 11.83.

EXAMPLE 2

4-(3-[p-fluorobenzoyl] propyl)-2,6-piperazinedione is obtained by refluxing a solution of 4-chloro-p-fluorobutyrophenone (.1 mole), 2,6-piperazinedione (.2 mole), and 0.2 gram of potassium iodide in toluene for 24 hours, as in Example 1.

EXAMPLE 3

4-(3-[p-methoxybenzoyl] propyl) - 1 - methyl-2-piperazinone is obtained by refluxing a solution of 4-chloro-p-methoxybutyrophenone (0.1 mole), 1-methyl-2-piperazinone (0.2 mole), and 0.2 gram of potassium iodide in toluene for 24 hours, as in Example 1.

EXAMPLE 4

4-phenacyl-1-benzyl-2,6-piperazinedione is obtained by refluxing a solution of 2-chloro-acetophenone (0.1 mole), 1-benzyl-2,6-piperazinedione (0.2 mole), and 0.2 gram potassium iodide in toluene for 24 hours, as in Example 1.

EXAMPLE 5

4-(2-[p-bromobenzoyl] ethyl)-1-phenyl - 2,6 - piperazinedione is prepared by refluxing in toluene 3-chloro-p-bromopropiophenone (0.1 mole), 1-phenyl-2,6-piperazinedione (0.2 mole) and 0.2 gram of potassium iodide for 24 hours.

The compounds of this invention can be administered in a wide variety of oral or parenteral unit dosage forms, singly, or in admixture with other active compounds.

The present invention also includes the process of bringing the compounds thereof into a form suitable for therapeutic administration by associating them with liquid or solid, pharmaceutically acceptable carriers.

Various changes and modifications of this invention can be made by those skilled in the art to which it relates and to the extent that such variations incorporate the spirit of the invention, they are included in the scope of the claims.

What is claimed is:
1. A compound of the formula:

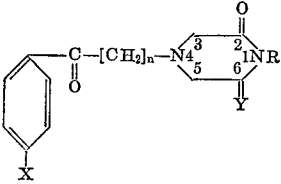

wherein X is selected from the group consisting of hydrogen, halogen and lower alkoxy; R is selected from the group consisting of hydrogen, lower alkyl and phenyl, Y is selected from the group consisting of oxygen and two hydrogens and $n$ ranges from 1 to 3.

2. 4-(3-[p-fluorobenzoyl] propyl)-2-piperazinone.

References Cited in the file of this patent
UNITED STATES PATENTS

| | | |
|---|---|---|
| 2,286,390 | Sparks | June 16, 1942 |
| 2,575,122 | Pollard et al. | Nov. 13, 1951 |
| 2,653,153 | De Benneville | Sept. 22, 1953 |
| 2,750,383 | Safiv et al. | June 12, 1956 |

UNITED STATES PATENT OFFICE
CERTIFICATE OF CORRECTION

Patent No. 3,171,837

March 2, 1965

Meier E. Freed

It is hereby certified that error appears in the above numbered patent requiring correction and that the said Letters Patent should read as corrected below.

Column 1, lines 33 to 37, the right-hand portion of the formula should appear as shown below instead of as in the patent:

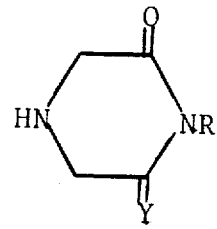

column 4, line 7, for "Safiv et al." read -- Safir et al. --.

Signed and sealed this 3rd day of August 1965.

(SEAL)
Attest:

ERNEST W. SWIDER
Attesting Officer

EDWARD J. BRENNER
Commissioner of Patents